(12) United States Patent
Kokubun (10) Patent No.: US 7,777,788 B2
(45) Date of Patent: Aug. 17, 2010

(54) DIGITAL CAMERA AND METHOD OF PREVENTING IMAGE DATA FROM BEING ERASED FROM THE DIGITAL CAMERA

(75) Inventor: Kozo Kokubun, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 397 days.

(21) Appl. No.: 11/970,741

(22) Filed: Jan. 8, 2008

(65) Prior Publication Data

US 2008/0117312 A1    May 22, 2008

Related U.S. Application Data

(63) Continuation of application No. 10/640,028, filed on Aug. 14, 2003, now Pat. No. 7,358,991.

(30) Foreign Application Priority Data

Aug. 19, 2002  (JP)  ............................. 2002-238147

(51) Int. Cl.
*H04N 5/76* (2006.01)
(52) U.S. Cl. ............... 348/231.2; 348/231.3; 348/231.6
(58) Field of Classification Search ............ 348/231.99, 348/231.2, 231.3, 231.6, 231.7
See application file for complete search history.

(56) References Cited

U.S. PATENT DOCUMENTS

| | | | | |
|---|---|---|---|---|
| 5,717,496 | A * | 2/1998 | Satoh et al. | ............... 358/402 |
| 6,108,759 | A | 8/2000 | Orcutt et al. | |
| 6,654,051 | B1 * | 11/2003 | Fujita et al. | ............... 348/231.1 |
| 6,661,455 | B1 * | 12/2003 | Toyofuku et al. | ........ 348/231.6 |
| 6,798,975 | B1 | 9/2004 | Fukushima | |
| 6,810,441 | B1 * | 10/2004 | Habuto et al. | ............. 348/231.9 |
| 6,850,273 | B1 | 2/2005 | Yoshida et al. | |
| 7,053,936 | B2 | 5/2006 | Imura et al. | |
| 7,098,948 | B2 | 8/2006 | Ikehata et al. | |
| 7,302,163 | B2 * | 11/2007 | Fukushima | ............... 348/231.1 |
| 7,405,753 | B2 * | 7/2008 | Misawa | ................... 348/231.2 |
| 7,612,806 | B2 * | 11/2009 | Kazami et al. | ........... 348/231.1 |
| 2001/0021965 | A1 | 9/2001 | Yokota et al. | |
| 2002/0063783 | A1 * | 5/2002 | Kurase | ........................ 348/231 |
| 2002/0126212 | A1 | 9/2002 | Yoneda | |

(Continued)

FOREIGN PATENT DOCUMENTS

JP        2001-22913 A        1/2001

(Continued)

*Primary Examiner*—John M Villecco
(74) *Attorney, Agent, or Firm*—Sughrue Mion, PLLC (57) ABSTRACT

The present invention relates to a digital camera, which is designed such that a recording medium can be loaded thereon, the medium capable of recording photographed image data and prohibiting recorded image data from being erased. The digital camera includes an initialization instruction unit for instructing the loaded recording medium to initialize, and a notification unit for performing a predetermined notification operation for notifying execution of initialization. In the digital camera, the notification unit performs the predetermined notification operation when image data which is prohibited from being erased is recorded on the recording medium when the recording medium is instructed to initialize by the initialization instruction unit. When the recording medium on which the image data which is prohibited from being erased is recorded is loaded, and when the recording medium is instructed to initialize, the digital camera can prevent the image data from being inadvertently erased.

8 Claims, 9 Drawing Sheets

U.S. PATENT DOCUMENTS

| | | |
|---|---|---|
| 2002/0191079 A1 | 12/2002 | Kobayashi et al. |
| 2006/0152599 A1 | 7/2006 | Yokonuma |
| 2007/0109426 A1* | 5/2007 | Satoh et al. .............. 348/231.2 |

FOREIGN PATENT DOCUMENTS

| | | |
|---|---|---|
| JP | 2001-78134 A | 3/2001 |
| JP | 2003-298998 A | 10/2003 |

* cited by examiner

DIGITAL CAMERA AND METHOD OF PREVENTING IMAGE DATA FROM BEING ERASED FROM THE DIGITAL CAMERA

CROSS-REFERENCE TO RELATED APPLICATION

This is a continuation of application Ser. No. 10/640,028 filed Aug. 14, 2003, which claims priority under 35 USC 119 from Japanese Patent Application No. 2002-238147. The entire disclosures of the prior applications are incorporated by reference herein.

BACKGROUND OF THE INVENTION

1. Field of the Invention

The present invention relates to a digital camera onto which a recording medium can be loaded, said medium capable of recording photographed image data and prohibiting the recorded image data from being erased.

2. Description of the Related Art

In recent years, with the increase in resolution of image pickup elements such as CCDs (Charge Coupled Device) or CMOS (Complementary Metal Oxide Semiconductor) image sensors, the demand for digital cameras has been rapidly increasing.

In such digital cameras, in general, image data obtained through an image pickup element by photographing is recorded on a portable recording medium loaded in the digital camera. In recent years, several types of digital cameras that are configured to accommodate various types of recording media have been manufactured.

Portable recording media that can be used in digital cameras of this type include many types of recording media such as Smart Media (Trademark), SD (Secure Digital) cards, memory sticks, Compact Flash (Trademark), and Microdrives are known. These recording media are provided with the following features in order to prevent recorded information from being erroneously erased.

The SD card and the memory stick have write-protect switches. When the switch is set to write-protect, recorded data is prevented from being erroneously erased. Furthermore, a write-protect seal is stuck on Smart Media, hence recorded data can be prevented from being erroneously erased.

A technology for preventing recorded data on an IC memory card from being erroneously erased is known (see Japanese Patent Application Laid-Open (JP-A) No. 2001-22913) in which a write-protect terminal, which can prevent data from being written by sticking an insulating sheet, is arranged on an IC memory card.

These technologies are used to simultaneously prevent all pieces of data on a recording medium from being erroneously erased. In a digital camera onto which these recording media can be loaded, when the loaded recording medium is set in an erroneous erase protect state, new data is not recorded on the recording medium, and recorded data is not erased as a matter of course. In addition, the digital camera is designed not to initialize (also referred to as "format" in this specification) the recording medium.

In addition to the above-mentioned technology for simultaneously preventing all pieces of data recorded on the recording medium from being erroneously erased, a technology for preventing data recorded as units of files from being erroneously erased is known. That is, a recording medium is designed such that a read-only attribute can be set for each file. The read-only attribute is set for only a file to be prohibited from being erased, so that the data is prevented from being erroneously erased as units of files. In this technology, the recording medium is initialized and all the pieces of information are erased regardless of the settings of the read-only attributes.

However, in some recording media such as Microdrive, simultaneous prevention of all pieces of recorded data from being erroneously erased has not been achieved, and only prevention of erroneous erasing in units of files can be performed by the read-only attributes.

Therefore, if a digital camera is designed such that a recording media of this type can be loaded, when the loaded recording medium is instructed to initialize, all pieces of data are erased, regardless of the settings of read-only attributes.

The present invention has been made to solve the above problems. The present invention provides a digital camera onto which a recording medium, which has image data set to be prohibited from being erased is recorded, is loaded and which can prevent the image data from being inadvertently erased when the recording medium is instructed to initialize. Further, the invention provides a method for preventing erasure in the digital camera.

SUMMARY OF THE INVENTION

In order to achieve the above object, according to the first aspect of the invention, there is provided a digital camera onto which a recording medium can be loaded, said medium capable of recording photographed data and prohibiting the recorded image data from being erased, comprising: an initialization instruction unit for instructing the loaded recording medium to initialize; and a notification unit for performing a predetermined notification operation for notifying execution of initialization, wherein the notification unit performs the predetermined notification operation when the recording medium is instructed to initialize by the initialization instruction unit, if image data, which is prohibited from being erased, is recorded on the recording medium.

In this manner, in the digital camera according to the first aspect of the invention, when the recording medium is instructed to initialize by the initialization instruction unit, when image data, which is prohibited from being erased, is recorded on the recording medium, the predetermined notification operation is performed.

As the notification operation performed by the notification unit, any notification operation performed to cause a user execute initialization and described below can be applied. That is, when a display unit such as a liquid crystal display, an organic EL display, or a plasma display is arranged on the digital camera of the invention, a notification operation is performed such that a message representing that initialization will be executed to the recording medium is displayed by the display unit. When a buzzer is arranged in the digital camera, a notification operation is performed by ringing the buzzer. When a lamp such as an LED is arranged in the digital camera, a notification operation is performed by turning on the lamp or flickering. When a voice generating device is arranged in the digital camera, a notification operation is performed such that a message representing that initialization will be executed to the recording medium is pronounced by the voice generating device. The recording medium includes any portable recording medium such as a Smart Media, an SD card, a memory stick, a Compact Flash (Trademark), and a Microdrive in which recording information can be prohibited from being erased.

More specifically, in the digital camera according to the first aspect of the invention, when the loaded recording medium is instructed to initialize, and image data prohibited from being erased is recorded on the recording medium, the digital camera urges a user to confirm whether the initialization is reliably executed prior to execution of the initialization. Therefore, the image data which is prohibited from being erased can be prevented from being easily erased by initialization.

In this manner, in the digital camera according to the first aspect of the invention, when the recording medium is instructed to initialize by the initialization instruction unit, if image data, which is prohibited from being erased, is recorded on the recording medium, the predetermined notification operation is performed. For this reason, when the recording medium is loaded, said medium capable of recording the image data, which is prohibited from being erased and the recording medium is instructed to initialize, the image data can be prevented from being inadvertently erased.

On the other hand, in order to achieve the above object, according to the second aspect of the invention, there is provided a digital camera, onto which a recording medium can be loaded, said medium capable of recording photographed data and prohibiting the recorded image data from being erased, comprising: an initialization instruction unit for instructing the loaded recording medium to initialize; a storage unit which can store the image data; and an initialization unit for initializing the recording medium, wherein, when the recording medium is instructed to initialize by the initialization instruction unit, if image data which is recorded on the recording medium is prohibited from being erased, the image data which is prohibited from being erased is stored in the storage unit, after which, the initialization unit initializes the recording medium, and then, the image data stored in the storage unit is recorded onto the recording medium.

In the digital camera according to the second aspect of the invention, when the recording medium is instructed to initialize by the initialization instruction unit, if image data which is recorded on the recording medium is prohibited from being erased, the image data which is prohibited from being erased is stored in the storage unit, and the initialization unit initializes the recording medium. For this reason, when the recording medium, which is capable of recording the image data and prohibiting recorded image data from being erased, is loaded, and when the recording medium is instructed to initialize, the image data can be prevented from being inadvertently erased. The storage unit includes various storage elements such as a RAM (Random Access Memory), an EEPROM (Electrically Erasable and Programmable Read Only Memory), and a Flash EEPROM.

More specifically, in the invention, when the recording medium is instructed to initialize by the initialization instruction unit, if image data which is recorded on the recording medium is prohibited from being erased, the image data which is prohibited from being erased is stored (backup) in the storage unit, and the initialization unit initializes the recording medium. Therefore, even though all the pieces of information on the recording medium are lost by initializing the recording medium, the image data which is prohibited from being erased is left in the storage unit.

In the invention, the image data stored (backup) in the storage unit is stored (returned) to the recording medium after the recording medium is initialized. Accordingly, the image data, which is prohibited from being erased, does not appear to be erased.

In this manner, in the digital camera according to the second aspect of the invention, when the recording medium is instructed to initialize by the initialization instruction unit, if image data which is recorded on the recording medium is prohibited from being erased, the image data which is prohibited from being erased is stored in the storage unit, and the initialization unit initializes the recording medium. For this reason, when the recording medium on which the image data which is prohibited from being erased is recorded is loaded and the recording medium is instructed to initialize, the image data can be prevented from being inadvertently erased.

According to the third aspect of the invention, there is provided a method of preventing image data from being erased in a digital camera, which is configured such that a recording medium can be loaded, said medium capable of recording photographed image data and prohibiting recorded image data from being erased, comprising: a step of instructing the loaded recording medium to initialize; and a step of performing a predetermined notification operation on the basis of the initialization instruction when image data which is prohibited from being erased is recorded on the recording medium.

According to the fourth aspect of the invention, there is provided a method of preventing image data from being erased in a digital camera onto which a recording medium can be loaded, said medium capable of recording photographed image data and prohibiting recorded image data from being erased, and which has a storage unit which can store the image data, comprising: a step of instructing the loaded recording medium to initialize; a step of storing image data, which is prohibited from being erased, in the storage unit on the basis of the initialization instruction of the recording medium when the image data recorded on the recording medium is prohibited from being erased, a step of initializing the recording medium; and a step of recording the image data stored in the storage unit onto the recording medium.

According to the fifth aspect of the invention, there is provided a method of preventing image data from being erased in a digital camera, onto which a recording medium can be loaded, said medium capable of recording photographed image data and prohibiting the recorded image data from being erased, and which has a storage unit which can store the image data, comprising: a step of instructing the loaded recording medium to initialize; a step of determining whether all pieces of image data, which are prohibited from being erased, can be stored in the storage unit on the basis of the initialization instruction of the recording medium if image data is prohibited from being erased; and a step of performing a predetermined notification operation when the determination result is negative, wherein the determination is performed such that, after an unused capacity of the storage unit is detected and capacities of the pieces of image data, which are prohibited from being erased, are added to each other, the value of the added volumes and the total amount of unused capacity are compared with each other.

DETAILED DESCRIPTION OF THE INVENTION

Embodiments of the present invention will be described below with reference to the accompanying drawings.

First Embodiment

Figure 1:
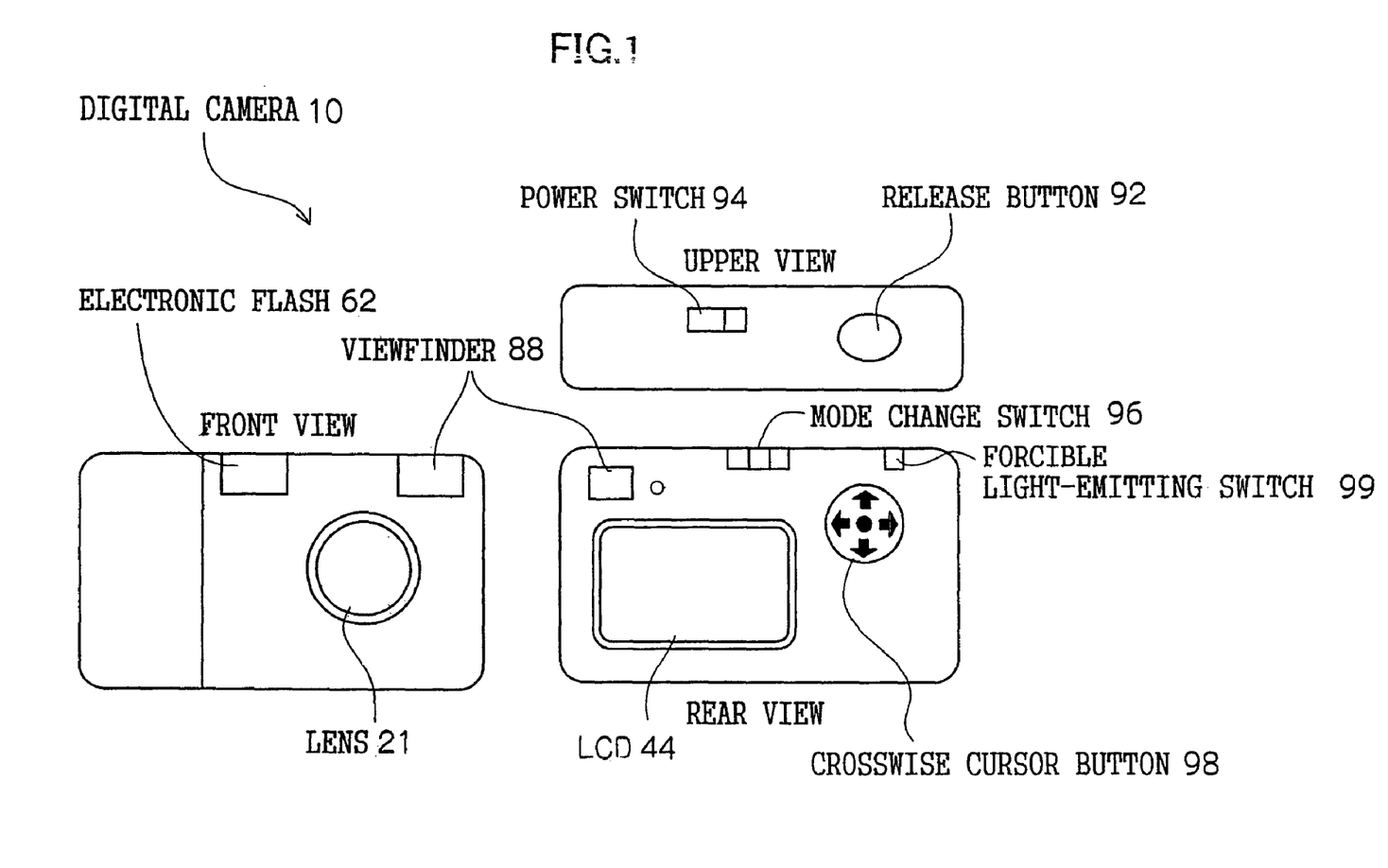
FIG. 1 is an outline view showing the appearance of a digital camera 10 according to an embodiment of the present invention.

Referring to FIG. 1, a seeming configuration of a digital camera 10 according to this embodiment will be described below. As shown in FIG. 1, in front of the digital camera 10, a lens 21 for forming an object image, an electronic flash 62 for emitting light irradiated on an object if necessary in photographing, and a viewfinder 88 used to determine a picture composition of an object to be photographed are arranged. On the upper surface of the digital camera 10, a release button (so-called shutter) 92 depressed by a user in execution of photographing and a power switch 94 are arranged.

The release button 92 of the digital camera 10 according to the embodiment is designed such that a depressing operation of two steps, i.e., a step in which the release button 92 is depressed to an intermediate position (to be referred to as a half depression state hereinafter) and a step in which the release button 92 is depressed to the final depression position being deeper than the intermediate position (to be referred to as a full depression state hereinafter) can be detected. In the digital camera 10, after the release button 92 is half depressed to operate an AE (Automatic Exposure) function to set an exposure state (shutter speed and the state of the aperture), an AF (Auto Focus) function is operated to control a focusing operation. Thereafter, the release button 92 is fully depressed, exposure (photographing) is performed.

On the other hand, on the back of the digital camera 10, the eyepiece unit of the viewfinder 88, a liquid crystal display (to be referred to as an "LCD" hereinafter) 44 for displaying an object image displayed by photographed digital image data, various menu screens, messages, and the like, a mode change switch 96 which is slidably operated by a user when any one of a photographing mode serving as a mode for performing photographing and a reproduction mode serving as a mode for displaying (reproducing) an object image shown by photographed digital image data on the LCD 44 is set, a crosswise cursor button 98 which is designed to include a total of five keys constituted by four arrow keys indicating moving directions of up, down, left, and right in the display area of the LCD 44 and a determination key positioned at a center of the four arrow keys, and a forcible light-emitting switch 99 which is depressed by a user when a forcible light-emitting mode serving as a mode for forcibly causing the electronic flash 62 to emit light in subsequent photographing.

The configuration of the electric system of the digital camera 10 according to the embodiment will be described below with reference to FIG. 2.

Figure 2:
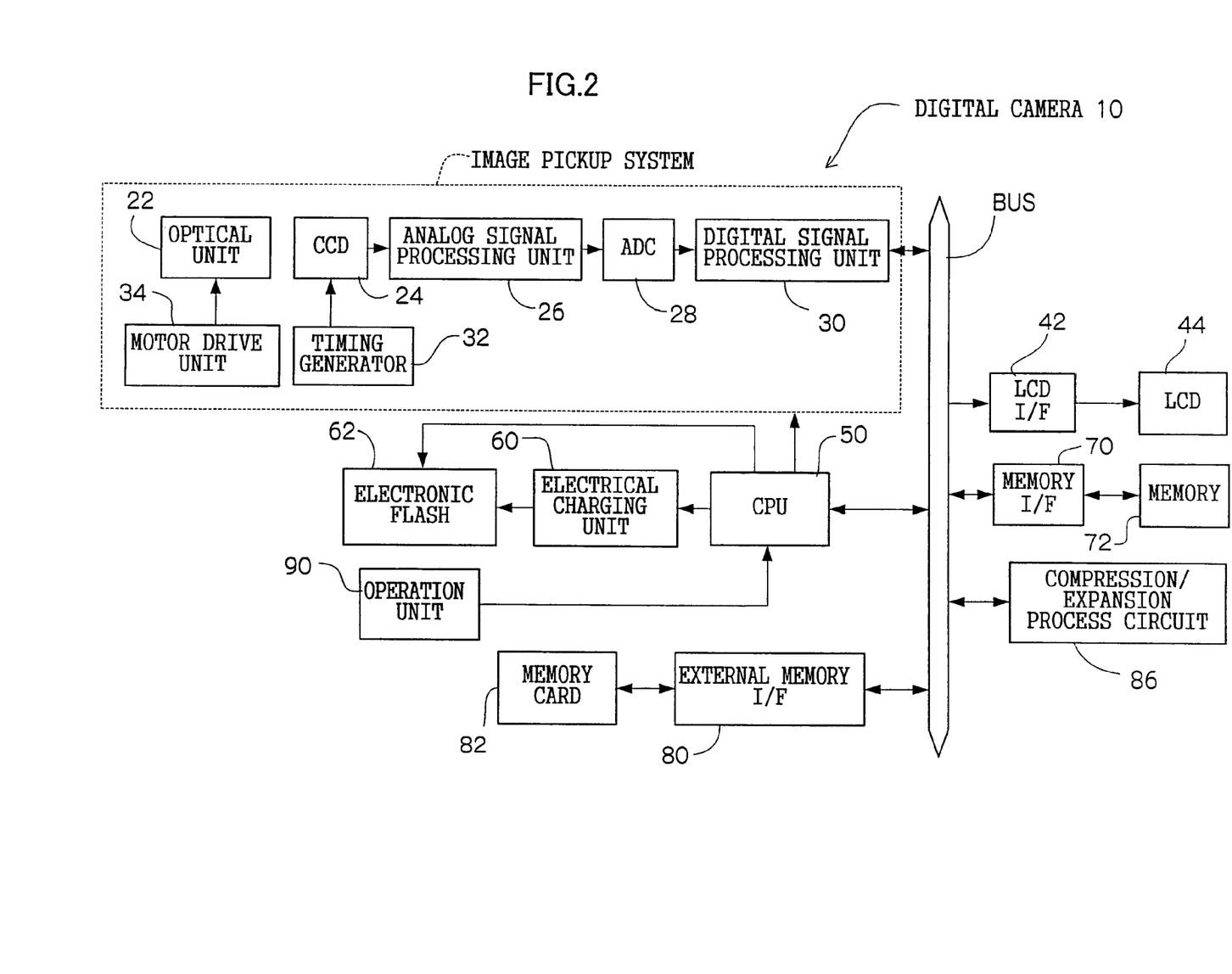
FIG. 2 is a block diagram of the configuration of the electric system of the digital camera 10 according to the embodiment of the present invention.

As shown in FIG. 2, the digital camera 10 includes an optical unit 22 including the lens 21, a charge coupled device (to be referred to as a "CCD" hereinafter) 24 arranged behind the lens 21 along the optical axis, an analog signal processing unit 26 including a correlated double sampling circuit (to be referred to as a "CDS" hereinafter), an analog/digital converter (to be referred to as an "ADC" hereinafter) 28 for converting an input analog signal into digital data, and a digital signal processing unit 30, having a line buffer having a predetermined capacity, for performing control for directly storing the input digital image data in a predetermined area of a memory 72 (will be described later) and for performing various digital image processing operations to the digital image data.

A correlated double sampling process performed by the CDS obtains accurate pixel data by calculating a difference between a field through component level and a pixel signal component level included in an output signal of each pixel of a solid-state image pickup element to reduce noise or the like (especially, thermal noise) included in an output signal of the solid-state image pickup element.

On the other hand, the digital camera 10 includes an LCD interface 42 for generating a signal for displaying an image, a menu screen, or the like shown by digital image data on the LCD 44 to supply the signal to the LCD 44, a CPU (Central Processing Unit) 50 for controlling the entire operation of the digital camera 10, a memory 72 constituted by a VRAM (Video RAM) for storing digital image data mainly obtained by photographing, a memory interface 70 for performing control of an access to the memory 72, an external memory interface 80 for enabling the digital camera 10 to access a memory card 82 constituted by a Compact Flash, and a compression/expansion process circuit 86 for performing a compression process to digital image data by a predetermined compression format and for performing an expansion process to the digital image data subjected to the compression process depending on the compression format.

The digital signal processing unit 30, the LCD interface 42, the CPU 50, the memory interface 70, the external memory interface 80, and the compression/expansion process circuit 86 are connected to each other through a system BUS. Therefore, the CPU 50 can control the operations of the digital signal processing unit 30 and the compression/expansion process circuit 86, can display various pieces of information on the LCD 44 through the LCD interface 42, and can access the memory 72 and the memory card 82 through the memory interface 70 and the external memory interface 80.

On the other hand, the digital camera 10 comprises a timing generator 32 for generating a timing signal for mainly driving the CCD 24 to supply the timing signal to the CCD 24. The drive of the CCD 24 is controlled by the CPU 50 via the timing generator 32.

The digital camera 10 further comprises a motor drive unit 34. The drives of a focus adjustment motor, a zoom motor, and an aperture drive motor which are arranged in the optical unit 22 are also controlled by the CPU 50 via the motor drive unit 34.

More specifically, the lens 21 included in the optical unit 22 according to the embodiment has a plurality of lenses, is constituted as a zoom lens which can change the focal length (variable power), and comprises, a lens drive mechanism (not shown). The lens drive mechanism includes the focus adjustment motor, the zoom motor, and the aperture drive motor. These motors are driven by drive signals supplied from the motor drive unit 34 under the control of the CPU 50.

The CPU 50 drives and controls the zoom motor when an optical zoom magnification is changed, and changes the focal length of the lens 21 included in the optical unit 22.

The CPU 50 drives and controls the focus adjustment motor such that a contrast of an photographed image performed by the CCD 24 is to maximum, thereby controlling a focusing operation. More specifically, in the digital camera 10 according to the embodiment, as a scheme for controlling a focusing operation, a so-called TTL (Through The Lens) scheme which sets a lens position to maximum a contrast of a read image is employed.

In addition, the various buttons and switches (generically called as "operation unit 90" in FIG. 2) such as the release button 92, the power switch 94, the mode change switch 96, the crosswise cursor button 98, and the forcible light-emitting switch 99 are connected to the CPU 50. The CPU 50 can always comprehend an operation state for the operation unit 90.

The digital camera 10 further comprises an electrical charging unit 60, interposed between the electronic flash 62 and the CPU 50, for charging power for causing the electronic flash 62 to emit light under the control of the CPU 50. In addition, the electronic flash 62 is also connected to the CPU 50, and light emission of the electronic flash 62 is controlled by the CPU 50.

Figure 3:
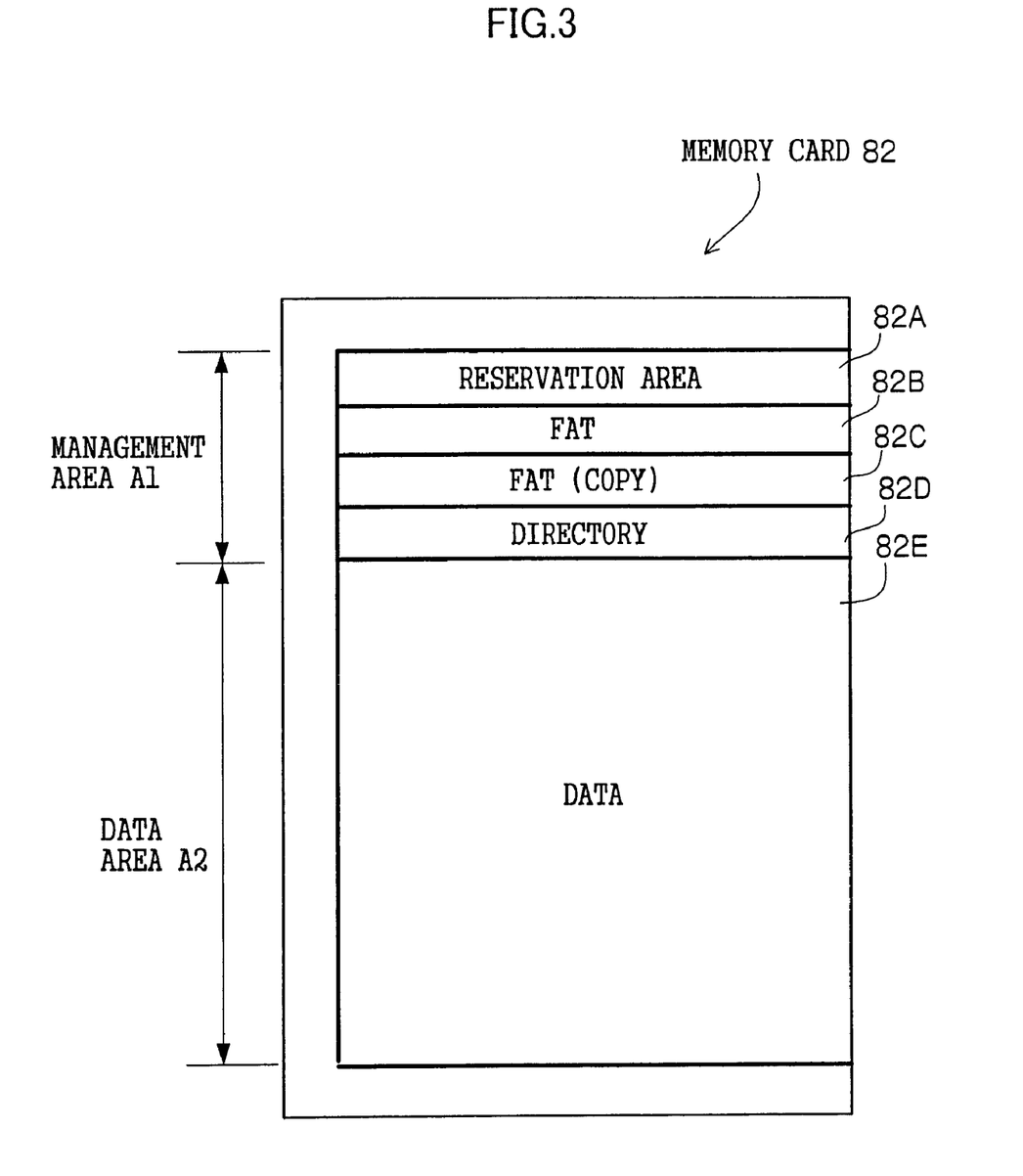
FIG. 3 is a pattern diagram showing the configuration of a recording area of a memory card 82 according to the embodiment of the present invention.

On the other hand, FIG. 3 typically shows recording areas of the memory card 82 according to the embodiment. As shown in FIG. 3, the recording areas of the memory card 82 are roughly classified into a management area A1 and a data area A2.

The management area A1 has a reservation area 82A for managing files, an FAT (File Allocation Table) 82B, an FAT 82C having the same contents as those of the FAT 82B, and a directory 82D. The two FATs are prepared for the safety of data. In contrast to this, in the data area A2, data such as digital image data to be recorded is recorded in units of files.

An access unit of the data area A2 is called a cluster. The cluster is constituted by a predetermined number of serial sectors. The data area A2 is divided into clusters each having a predetermined data size, and a use state of a specific cluster can be known by a corresponding FAT entry. One file data is constituted by one cluster or a plurality of clusters depending on the data size.

The recording contents in an area in which no data is recorded are generally buried with '0' or 'F' of in hexadecimal ('15' in decimal). However, it is assumed in the following description that the recording contents are buried with 'F' in hexadecimal.

The FAT 82B is a map for indicating a storage position of the file. The map shows clusters on which the files are recorded and an order of the files. The FAT has entries corresponding to the respective clusters. When a file cannot be stored in one cluster, the entry number of the cluster next to the cluster in which the file is stored is recorded on an entry of the FAT. When a FAT entry is not '0', the cluster corresponding to the FAT entry is used. When a FAT entry is '0', the cluster corresponding to the FAT entry is not used.

On the other hand, on the directory 82D, a file name, an attribute, a date on which the file is created or on which the file is recently updated, the start FAT entry of the file, a file size, and the like are recorded for each file. The attributes indicate the type of a file represented by a corresponding file name. With respect to a file which is designated as a read-only file by a user, as the attribute of this file, 'R' representing a read-only attribute is recorded. The files to which the read-only attributes are set are prohibited from being erased in units of files. In this manner, the setting of image data erasing prohibition can be performed in units of photographed images.

Since a technology for managing recording media by directories and FATs is generally known, a further description thereof will be omitted.

The digital camera 10 according to the embodiment has functions for executing various processes such as a format process for formatting (corresponding to "initialization" in the invention) the loaded memory card 82 when the reproduction mode is set and a protect mode process for preventing the recorded contents of the data area A2 in the memory card 82 from being erased. A user designates a desired process on a reproduction mode menu screen (also see FIG. 5A) (to be described later) displayed on the LCD 44 to cause the digital camera 10 to execute the desired process.

The digital camera 10 according to the embodiment is designed such that photographed digital image data is recorded in the data area A2 of the memory card 82 in units of files. The protect mode process includes two types of modes, i.e., a "1-frame protect" mode which prohibits image files recorded in the data area A2 of the memory card 82 from being erased in units of image files and an "all-frame protect" mode which simultaneously prohibits all image files recorded in the data area A2 from being erased.

The memory card 82 corresponds to the recording medium according to the embodiment, the crosswise cursor button 98 corresponds to an initialization instruction unit according to the embodiment, and the CPU 50 corresponds to a notification unit according to the embodiment. The recording medium according to the embodiment has image erasure prohibition information for an image to which prohibition of erasure of image data is set.

The operation of the digital camera 10 according to this embodiment will be described below. The entire operation of the digital camera 10 in a photographing state will be briefly described below.

An image pickup operation is performed by the CCD 24 through the optical unit 22, R (red), G (green), and B (blue) signals representing an object image are sequentially output to the analog signal processing unit 26. The analog signal processing unit 26 performs analog signal processing such as correlated double sampling process to the signals input from the CCD 24, and the resultant signals are sequentially output to the ADC 28. The ADC 28 converts the R, G, and B signals input from the analog signal processing unit 26 into 12-bit R, G, and B signals (digital image data) and sequentially output the 12-bit R, G, and B signals to the digital signal processing unit 30. The digital signal processing unit 30 accumulates the digital image data sequentially input from the ADC 28 into the built-in line buffer and temporarily stored in a predetermined area of the memory 72.

The digital image data stored in the predetermined area of the memory 72 are read by the digital signal processing unit 30 under the control of the CPU 50. These digital image data are subjected to a digital gain depending on a predetermined physical quantity to perform white balance adjustment. A gamma process and a sharpness process are performed to the digital image data to generate 8-bit digital image data. Furthermore, YC signal processing is performed to the resultant digital image data to generate a luminance signal Y and chroma signals Cr and Cb (to be referred to as YC signals hereinafter). The YC signals are stored in an area different from the predetermined area of the memory 72.

The LCD 44 is designed to be used as a viewfinder which displays a video (through images) obtained by serial image pickup operations performed by the CCD 24. However, when the LCD 44 is used as a viewfinder as described above, generated YC signals are sequentially output to the LCD 44 through the LCD interface 42. In this manner, the through images are displayed on the LCD 44.

At this time, when the release button 92 is half depressed by a user, after the AE function operates to set an exposure state as described above, the AF function operates to control a focusing operation. Thereafter, when the release button 92 is fully depressed, the YC signals stored in the memory 72 at this time are compressed in a predetermined compression format (JPEG format in the embodiment) by the compression/expansion process circuit 86 and then recorded on the memory card 82 through the external memory interface 80, thereby performing a photographing operation.

Figure 4A:
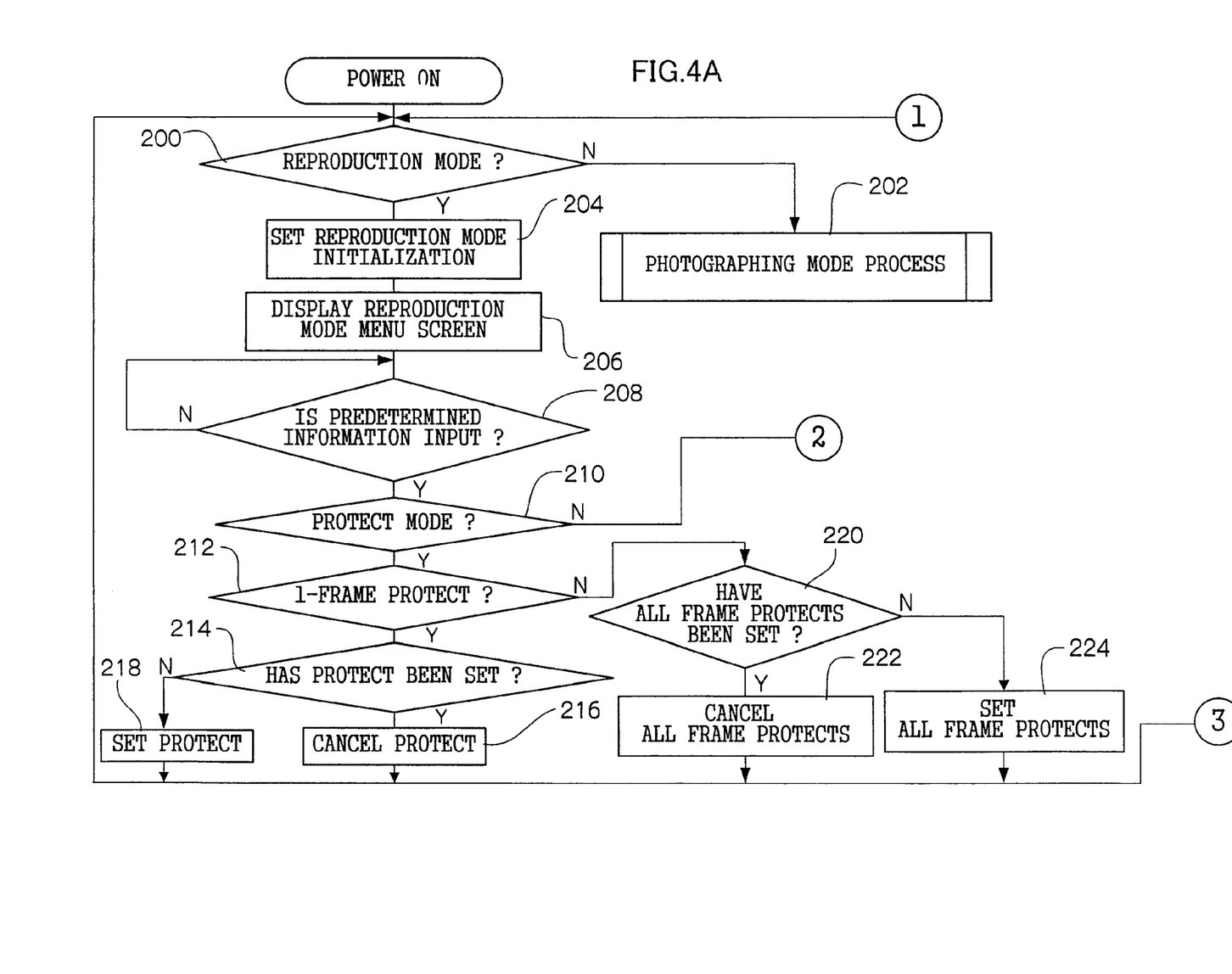
FIG. 4A and FIG. 4B are a flow chart showing a flow of processes of a power-on processing program according to the embodiment of the present invention.
Figure 4B:
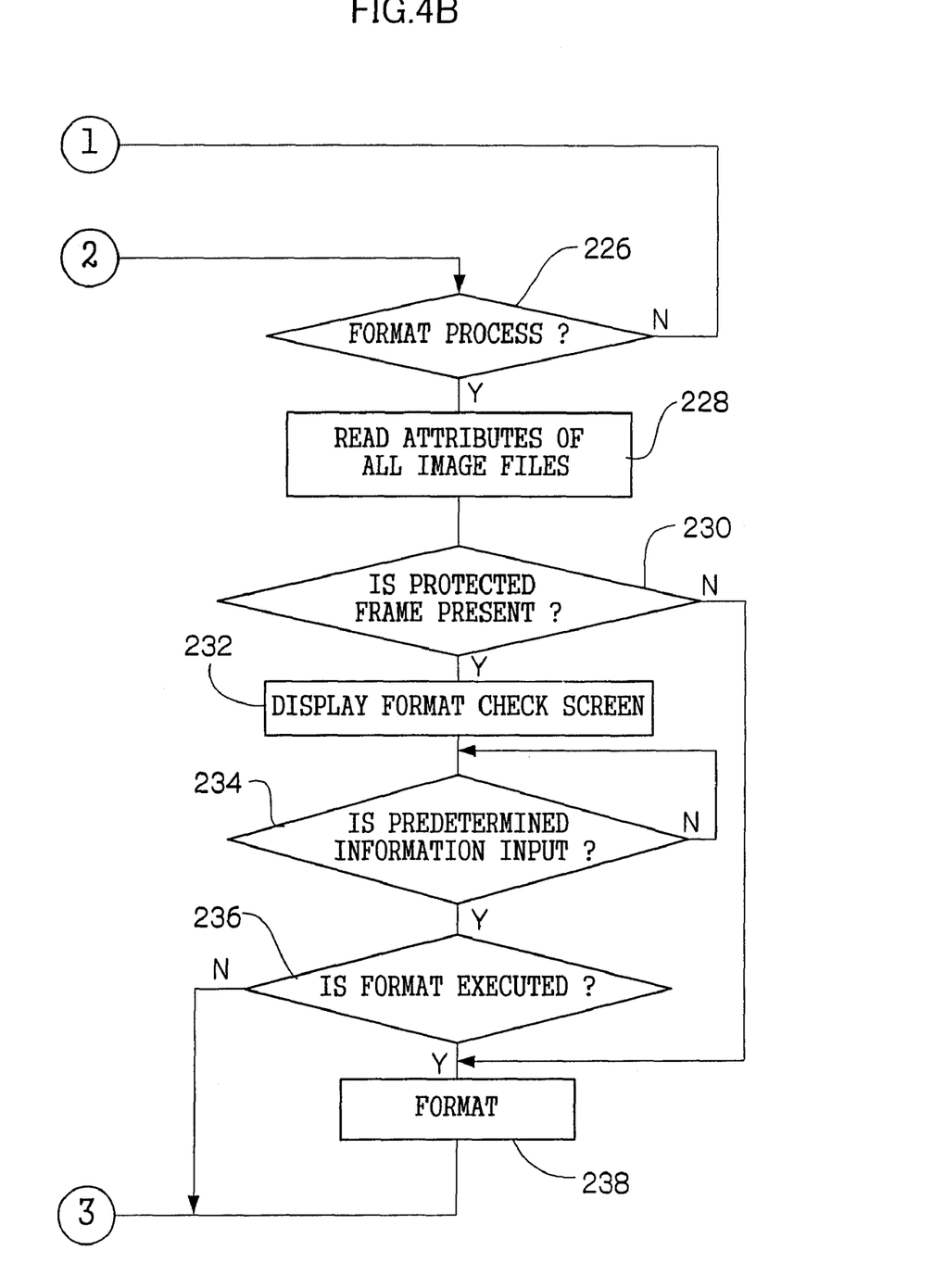

A power-on process executed by the digital camera 10 according to this embodiment will be described below with reference to FIGS. 4A and 4B. FIGS. 4A and 4B give a flow chart showing a flow of processes of a power-on processing program executed by the CPU 50 of the digital camera 10 when the power switch 94 is set in an ON state. In this case, a case in which the memory card 82 on which an image file is recorded is loaded on the digital camera 10 will be described below.

In step 200 in FIG. 4A, the CPU 50 determines whether a reproduction mode is set by the operation of the mode change switch 96 performed by a user. When the determination result is negative in step 200, the CPU 50 regards that a photographing mode is set to shift and shifts to step 202 to perform a process in a normal photographing mode. On the other hand, when the determination result is affirmative in step 200, the CPU 50 shifts to step 204 to perform various initial settings for a reproduction mode and then shifts to step 206.

In the initial settings in step 204, a process of displaying, on the LCD 44, an object image represented by an image file (for example, the file with the most recently updated or the most recently created file recorded in the directory 82D) complying with a predetermined rule of image files recorded on the loaded memory card 82 is also performed. The displayed object image can be arbitrarily changed into an object image represented by another image file recorded on the memory card 82 by operating the crosswise cursor button 98.

In step 206, the LCD interface 42 is controlled such that a predetermined reproduction mode menu screen is displayed on the LCD 44 by using an OSD (On Screen Display) function. The CPU 50 waits for an input of predetermined information in the next step 208.

Figure 5A:
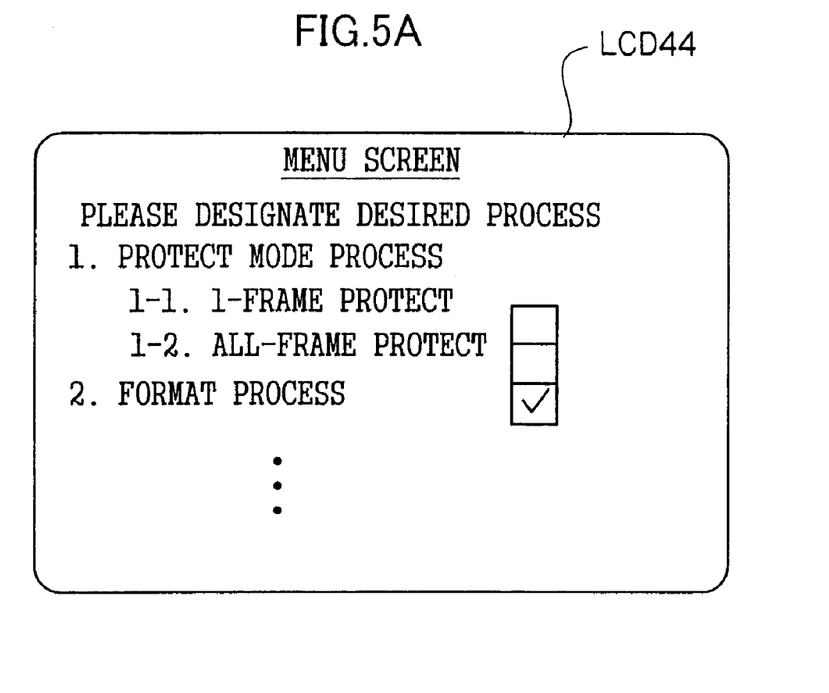
FIG. 5A is a schematic view showing a display of a reproduction mode menu screen.

FIG. 5A shows the reproduction mode menu screen displayed on the LCD 44 by the process in step 206. As shown in FIG. 5A, in the reproduction mode menu screen according to the embodiment, a message for urging a user to designate a desired process is displayed, and various process names such as the "protect mode process" and the "format process" are displayed as process which can be designated. As the protect mode process according to the embodiment, as described above, two types of processes, i.e., the "1-frame protect" process and the "all-frame protect" process are prepared as described above. These names of the processes are also displayed on the menu screen. In addition, on the menu screen, in order to clarify a designation state by a user, rectangle frames representing the presence or absence of designation for processes are displayed.

In the embodiment, since the reproduction mode menu screen is displayed on the LCD 44 by an OSD function, the menu screen is displayed such that the menu screen overlaps an object image displayed on the LCD 44. However, in FIG. 5A, the object image is graphically omitted to avoid the drawing from being complicated.

When the reproduction mode menu screen as shown in FIG. 5A is displayed on the LCD 44, a user designates a desired process by operating the arrow keys of the crosswise cursor button 98 and then depresses and operates the determination key of the crosswise cursor button 98. Accordingly, information representing that the determination key is operated is input to the CPU 50. The CPU 50 determines an affirmative result in step 208 and shifts to step 210. FIG. 5A shows a state in which a format process is designated by a user.

In step 210, the CPU 50 determines whether a process designated by a user on the reproduction mode menu screen is the protect mode process ("1-frame protect" or "all-frame protect" process). When the determination result is negative in step 210, the CPU 50 shifts to step 212 to determine whether the protect mode process designated by the user is the 1-frame protect mode process. When the determination result is affirmative in step 212, the CPU 50 shifts to step 214.

In step 214, CPU 50 determines whether a read-only attribute is set in an image file (in the embodiment, image file corresponding to an object image displayed on the LCD 44 at this time) to be processed, thereby determines whether the protect is set in the image file. When the determination result is affirmative in step 214, the CPU 50 shifts to step 216 to cancel the read-only attribute of the image file to cancel the protect of the image file. Thereafter, the CPU 50 returns to step 200. When the determination result is negative in step 214, the CPU 50 shifts to step 218 to set a read-only attribute to the image file to set the protect of the image file. Thereafter, the CPU 50 returns to step 200.

More specifically, in the 1-frame protect process in the embodiment, when protect has been set in an image file to be processed, the protect is canceled. In contrast to this, when no protect is set in the image file, protect is set in the image file.

On the other hand, when the determination result is negative in step 212, the CPU 50 regards the protect mode process designated by the user as the all-frame protect process to shift to step 220.

In step 220, the CPU 50 determines whether the all-frame protect mode has been set by determining whether read-only attributes are set in all image files recorded on the loaded memory card 82. When the determination result is affirmative in step 220, the CPU 50 shifts to step 222 to cancel the read-only attributes of all the image files recorded on the memory card 82 to cancel the protects of all the image files. Thereafter the CPU 50 returns to step 200. When the determination result is negative in step 220, the CPU 50 shifts to step 224 to set read-only attributes in all the image files to set protects of all the image files. Thereafter the CPU 50 returns to step 200 described above.

More specifically, in the all-frame protect process according to the embodiment, when protects have been set in all image files recorded on the memory card 82, all the protects are canceled. In contrast to this, when protects are not set in all the image files, protects are set in all the image files.

On the other hand, when the determination result is negative in step 210, the CPU 50 shifts to step 226.

In step 226, when the CPU 50 determines whether a process designated by a user on the reproduction mode menu screen is a format process. When the determination result is affirmative in step 226, the CPU 50 shifts to step 228 to read the attributes of all the image files recorded on the memory card 82 from the directory 82D of the memory card 82.

In the next step 230, the CPU 50 determines whether an image file in which a protect is set is stored in the memory card 82 by determining whether the read attributes include a read-only attribute. When the determination result is affirmative in step 230, the CPU 50 shifts to step 232 to control the LCD interface 42 such that a predetermined format check screen is displayed on the LCD 44. In the next step 234, the CPU 50 waits for an input of predetermined information.

Figure 5B:
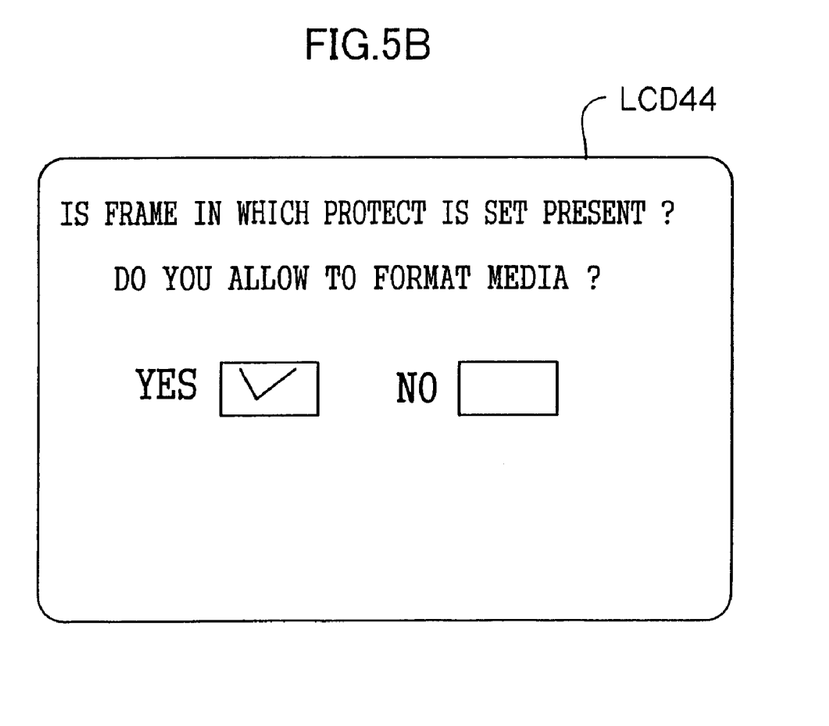
FIG. 5B is a schematic view showing a display of a format check screen.

FIG. 5B shows the format check screen displayed on the LCD 44 by the process in step 232. As shown in FIG. 5B, on the format check screen in the embodiment, a message representing that the image file in which a protect is set is stored in the memory card 82 and a message for urging a user to perform an input for determining whether format can be executed are displayed, and an expression representing "YES" which is designated when the format may be executed and an expression representing "NO" which is designated when the format may not be executed are displayed together with a rectangular frame representing the presence or absence of designation.

When a format check screen as shown in FIG. 5B is displayed on the LCD 44, a user designates "YES" or "NO" by operating the arrow keys of the crosswise cursor button 98 and then depresses and operates the determination key of the crosswise cursor button 98. Accordingly, information representing that the determination key has been operated is input to the CPU 50. The CPU 50 determines an affirmative result in step 234 to shift to step 236. In FIG. 5B, a state in which "YES" representing that the formatting may be performed is designated by the user is shown.

In step 236, the CPU 50 determines whether "YES" is designated by the user on the format check screen to determine whether the loaded memory card 82 will be formatted. When the determination result is affirmative in step 236, the CPU 50 shifts to step 238 to format the memory card 82 and then returns to step 200. When the determination result is negative in step 236, the CPU 50 returns to step 200 without executing the process in step 238.

On the other hand, when the determination result is negative in step 226, a process (process except for the "protect mode process" and the "format process") designated by the user on the reproduction mode menu screen is executed. Thereafter, the CPU 50 returns to step 200.

As described above, in the digital camera 10 according to the embodiment, when instruction information for instructing the loaded memory card 82 to initialize (format) is input, a notification representing that initialization depending on the instruction information will be executed is made when an image file which is prohibited from being erased is recorded on the memory card 82. For this reason, when the memory card 82 on which the image file which is prohibited from being erased is recorded is loaded and the memory card 82 is instructed to initialize, the image file can be prevented from being inadvertently erased.

The embodiment describes the case in which, as a notification operation representing that initialization will be executed, a notification made by displaying a message representing that the initialization will be executed to the memory card 82 on the LCD 44 is applied. However, the invention is not limited to this configuration. For example, any notification such as a notification by ringing a buzzer, a notification by turning on or flickering of a lamp, a notification by causing a voice generation device to pronounce a message representing that initialization will be executed to a recording medium, or the like which can notify a user that the initialization will be executed can be applied. In these cases, the same effect as in the embodiment can be achieved.

Second Embodiment

The second embodiment of the invention will be described below. Since the configuration of a digital camera according to the second embodiment is the same as that of the digital camera 10 (see FIGS. 1 and 2) according to the first embodiment, a description thereof will be omitted.

The memory card 82 corresponds to a recording medium of the embodiment, the crosswise cursor button 98 corresponds to an initialization instruction unit according to the embodiment, the memory 72 corresponds to the storage unit according to the embodiment and the CPU 50 corresponds to an initialization unit according to the embodiment.

Figure 6A:
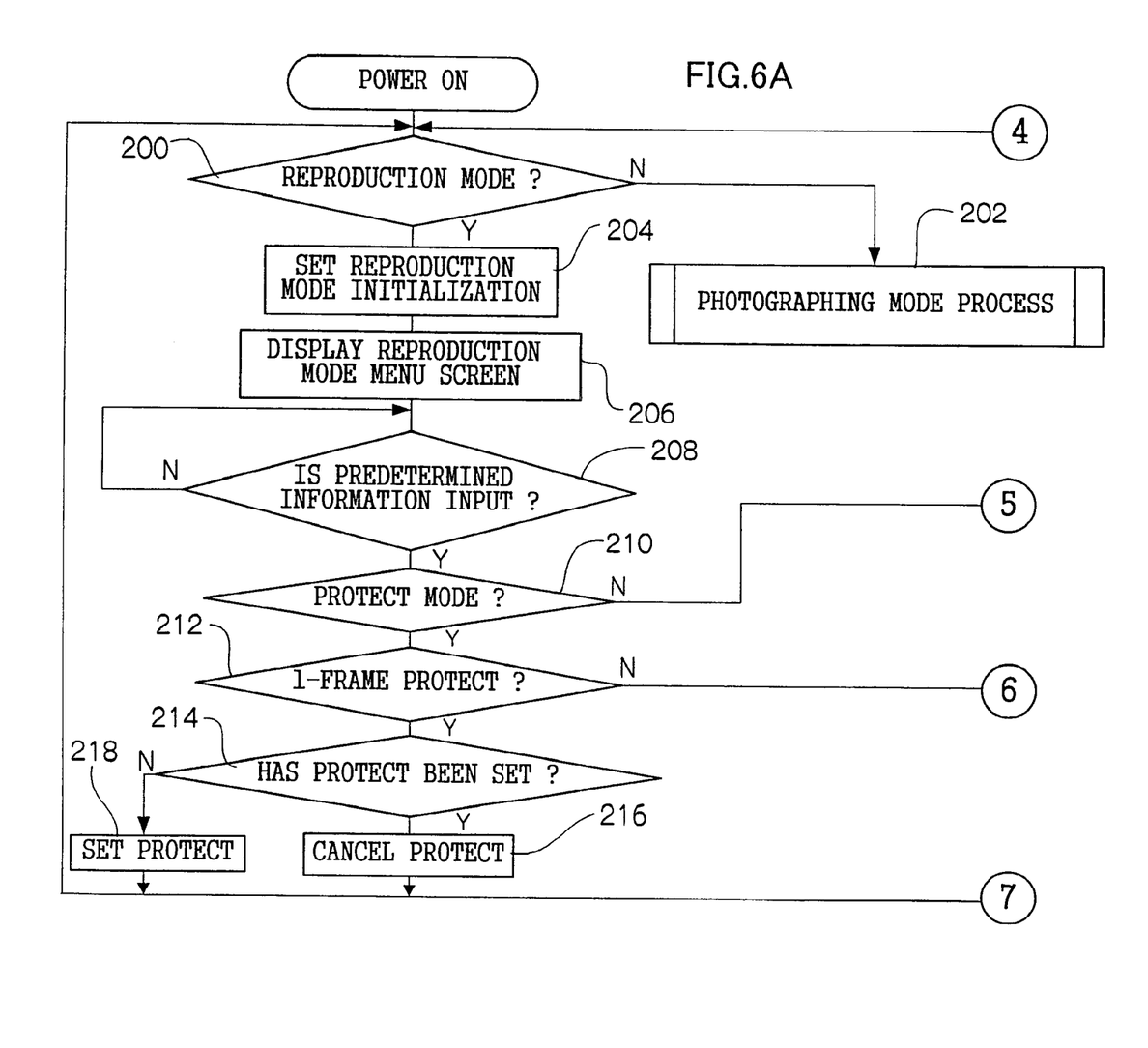
FIG. 6A and FIG. 6B are a flow chart showing a flow of processes of a power-on processing program according to the embodiment.
Figure 6B:
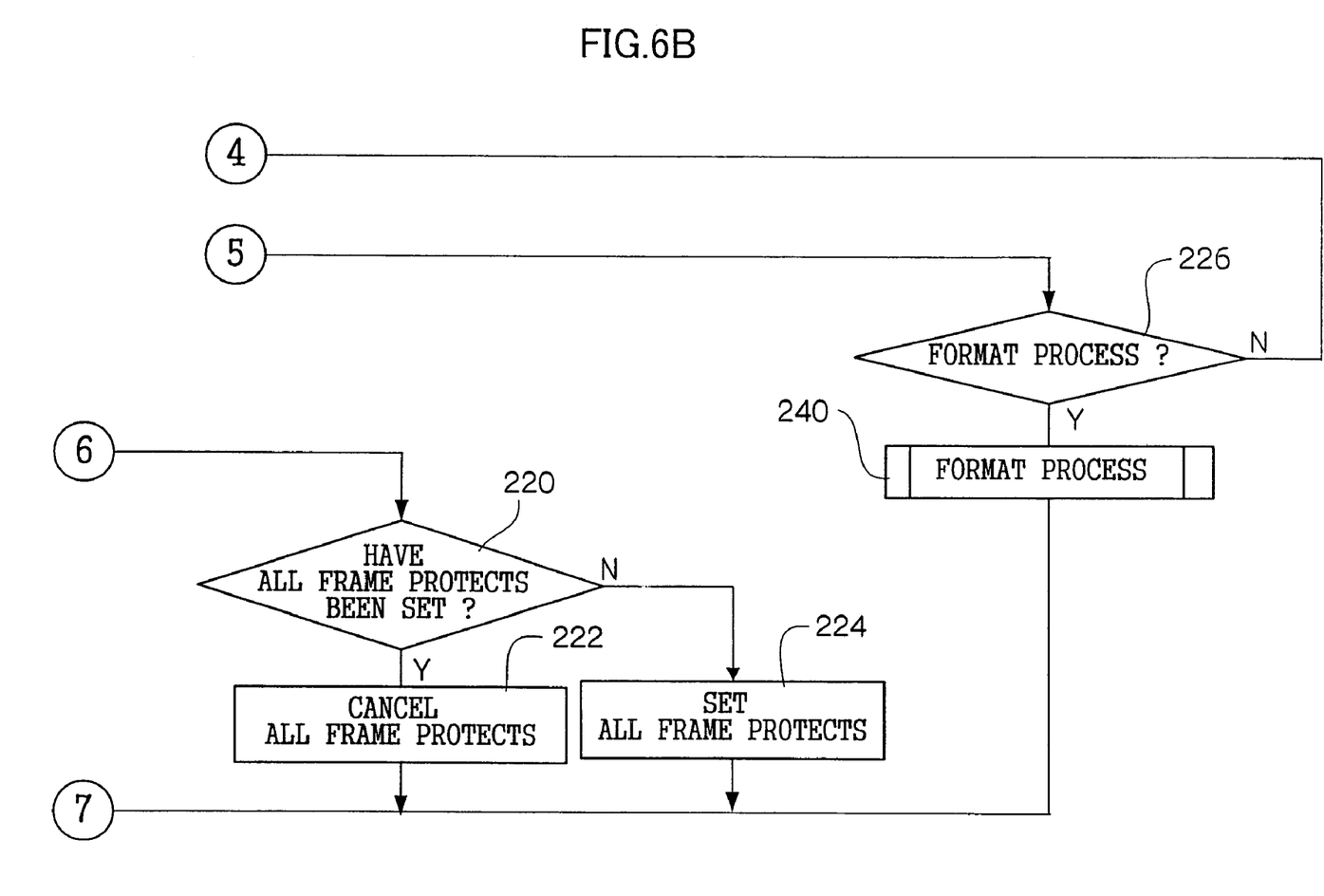

A power-on process executed by the digital camera 10 according to the embodiment will be described below with reference to FIGS. 6A and 6B. FIGS. 6A and 6B give a flow chart showing a flow of processes of a power-on processing program executed by the CPU 50 of the digital camera 10 according to the second embodiment when the power switch 94 is set in an ON state. The same step numbers as in FIGS. 4A and 4B denote the steps of performing the same processes in FIGS. 6A and 6B, and a description thereof will be omitted.

Figure 7:
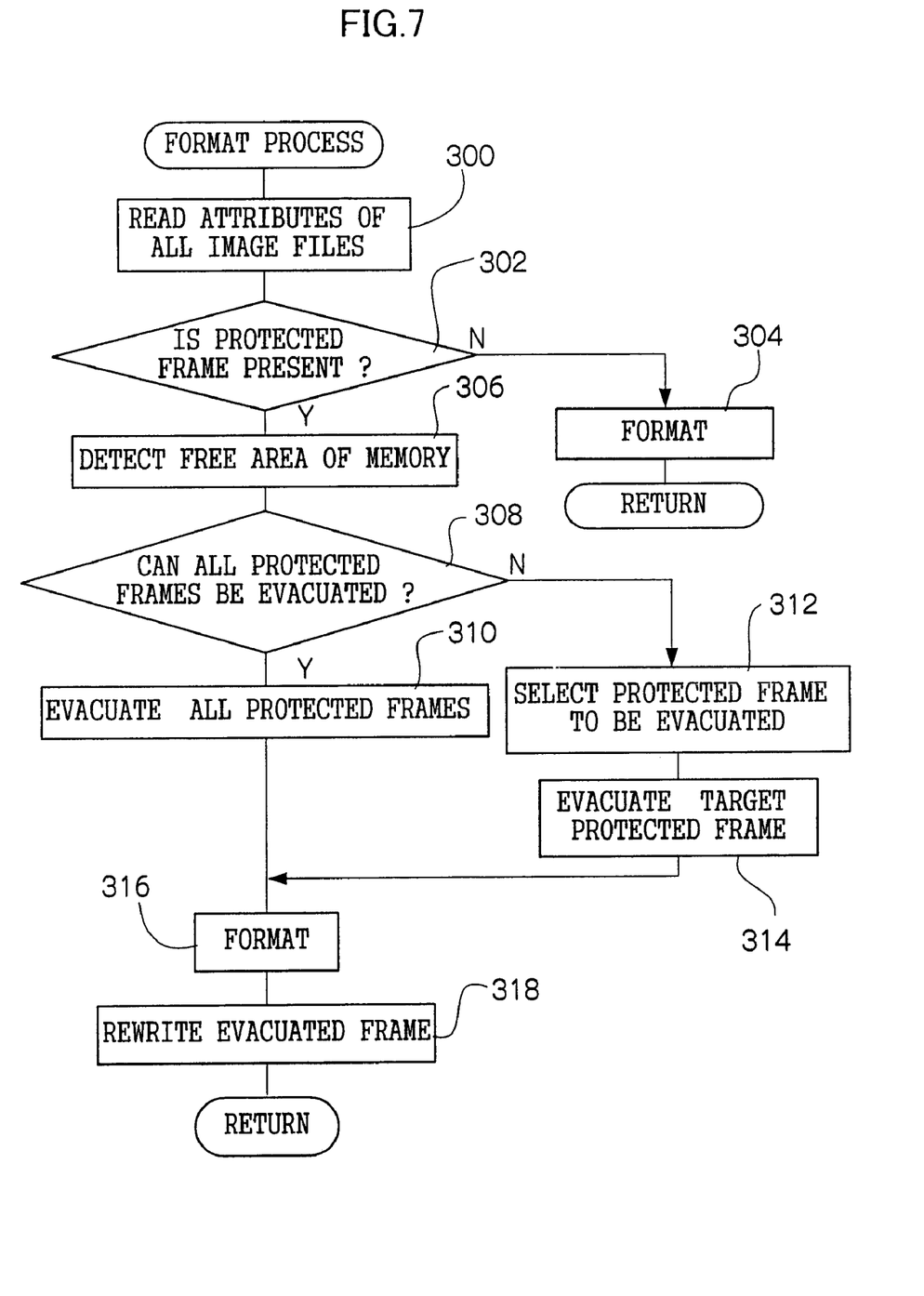
FIG. 7 is a flow chart showing a flow of processes of a format processing program according to the embodiment of the present invention.

As shown in FIGS. 6A and 6B, the power-on process according to the second embodiment is different from the power-on process according to the first embodiment in only that a formatting process (see FIG. 7) in step 240 is applied in place of the processes in steps 228 to 238 in FIG. 4B. The format process will be described below with reference to FIG. 7. FIG. 7 is a flow chart showing a flow of processes of the format processing program executed by the CPU 50 of the digital camera 10 when the format process is executed.

In step 300 in FIG. 7, the attributes of all the image files recorded on the loaded memory card 82 are read from the directory 82D of the memory card 82.

In the next step 302, the CPU 50 determines whether an image file in which a protect is set is stored in the memory card 82 by determining whether the read attributes include a read-only attribute. When the determination result is negative in step 302, the CPU 50 shifts to step 304 to format the memory card 82 and then end this format process, and the CPU 50 returns to step 200 (also see FIGS. 6A and 6B).

On the other hand, when the determination result is affirmative in step 302, the CPU 50 shifts to step 306 to detect an unused capacity (remaining storage capacity) of the memory 72. In the next step 308, file sizes of all the image files in which read-only attributes are set as attributes read in step 300 are read from the directory 82D of the memory card 82 and added to each other, and, on the basis of the value of the added capacities and the total unused capacity of the memory 72 detected in step 306, the CPU 50 determines whether all the image files in which protects are set can be stored (backup) in the memory 72. When the determination result is affirmative in step 308, the CPU 50 shifts to step 310 to store all the image files in which protects are set are stored (backup) in the unused capacity of the memory 72, and then shifts to step 316.

When the determination result is negative in step 308, the CPU 50 shifts to step 312 and selects an image file to be backup to the memory 72 from the image files in which protects are set on the basis of a predetermined priority order. In the next step 314, the selected image file is stored (backup) in the unused capacity of the memory 72. Thereafter, the CPU 50 shifts to step 316. As a method of selecting an image file in step 312, the following two methods will be exemplified.

1. With respect to all the image files in which protects are set, information representing dates on which the files are created or recently updated is read from the directory 82D of the memory card 82, and image files which can be stored in the memory 72 are selected prioritizing a new image file.

2. With respect to all the image files in which protects are set, image files which can be stored in the memory 72 are selected prioritizing an image file having a large (small) file size.

It is considered that an image file having a near recording data or an image file having a large size is frequently used. On the other hand, when the image files are stored (backup) in ascending order, many image files can be stored.

In the embodiment, method 1 described above is applied as a method of selecting an image file. By the processes in step 310, step 312, and step 314, the image files which are stored in the memory card 82 and in which protects are set are maximally stored (backup) in the unused capacity of the memory 72.

In step 316, the memory card 82 is formatted. In the next step 318, by the processes in step 310 or step 314, the image files backup to the memory 72 are stored in the memory card 82. Thereafter, the CPU 50 ends this format processing program to return to step 200 (also see FIGS. 6A and 6B).

As described above in detail, in the digital camera 10 according to the embodiment, when instruction information for instructing the loaded memory card 82 to initialize (format) is input, after image files which are recorded on the memory card 82 and which are prohibited from being erased are stored in the memory 72, the memory card 82 is initialized. Thereafter, the image files stored in the memory 72 are recorded on the memory card 82. For this reason, when the memory card 82 on which the image files which are prohibited from being erased is loaded, and when the memory card 82 is instructed to initialize, the image files can be prevented from inadvertently erased.

In the digital camera 10 according to the embodiment, when all image files which are prohibited from being erased cannot be stored in the memory 72 due to a lack of storage capacity of the memory 72, image files which have been selected on the basis of a predetermined priority order are stored in the memory 72. For this reason, even though the storage capacity of the memory 72 is short, image files the ranks of which are highly ranked in the predetermined priority order can be stored in the memory 72, and the image files can be prevented from being inadvertently erased.

The second embodiment describes the case in which, when the unused capacity of the memory 72 is short, image files in which protects are set are backup in a predetermined priority order without giving any notification to a user. However, the invention is not limited to this configuration. For example, a user may be notified that the unused capacity of the memory 72 is short. This configuration enables a user to recognize that all image files in which protects are set cannot be held, and leaves room for reconsidering execution of initialization.

Each of these embodiments describes the case in which a Compact Flash is applied as a recording medium of the invention. However, the invention is not limited to the recording medium. For example, a Smart Media, an SD card, a memory stick, a Microdrive, and the like can be applied as a matter of course. In this case, the same effect as that in each of the embodiments can be achieved.

Furthermore, the flows of processes of various processing programs described in the embodiments (see FIG. 4A, FIG. 4B, FIG. 6A, FIG. 6B, and FIG. 7) are only examples. These flows can be appropriately changed without departing from the spirit and scope of the invention.

According to the first aspect of the invention, there is provided a digital camera, onto which a recording medium can be loaded, said medium capable of recording photographed data and prohibiting recorded image data from being erased, comprising: an initialization instruction unit for instructing the loaded recording medium to initialize; and a notification unit for performing a predetermined notification operation that notifies that initialization will be executed, wherein the notification unit performs the predetermined notification operation when the recording medium is instructed to initialize by the initialization instruction unit, if image data, which is prohibited from being erased, is recorded on the recording medium.

In this manner, in the digital camera according to the first aspect of the invention, when the recording medium is instructed to initialize by the initialization instruction unit, if image data, which is prohibited from being erased, is recorded on the recording medium, the predetermined notification operation is performed. For this reason, when the recording medium is loaded, said medium capable of recording the image data, which is prohibited from being erased and the recording medium is instructed to initialize, the image data can be prevented from being inadvertently erased.

In the digital camera according to the first aspect of the invention, the recording medium may have image erasure prohibition information for image data, which is prohibited from being erased.

In the digital camera according to the first aspect of the invention, the image data may be prohibited from being erased in units of photographed images.

The digital camera according to the first aspect of the invention further comprises an erasure prohibition information detection unit. The erasure prohibition information detection unit may perform a detection operation for detecting the presence or absence of image erasure prohibition information in the loaded recording medium when the recording medium is instructed to initialize by the initialization instruction unit, and may cause the notification unit to perform a predetermined notification operation when a recording medium having the image erasure prohibition information is detected.

The digital camera according to the first aspect of the invention further comprises a liquid crystal display. The notification operation for notifying that initialization will be executed, in response to the instruction information, may be performed by displaying a message on the liquid crystal display indicating that initialization will be executed.

According to the second aspect of the invention, there is provided a digital camera, onto which a recording medium can be loaded, said medium capable of recording photographed image data and prohibiting the recorded image data from being erased, comprising: an initialization instruction unit for instructing the loaded recording medium to initialize; a storage unit which can store the image data; and an initialization unit for initializing the recording medium, wherein, when the recording medium is instructed to initialize by the initialization instruction unit, if image data which is recorded on the recording medium is prohibited from being erased, the image data which is prohibited from being erased is stored in the storage unit, the initialization unit initializes the recording medium, and then, the image data stored in the storage unit is recorded onto the recording medium.

In this manner, in the digital camera according to the second aspect of the invention, when the recording medium is instructed to initialize by the initialization instruction unit, image data which is recorded on the recording medium is prohibited from being erased, the image data which is prohibited from being erased is stored in the storage unit, and the initialization unit initializes the recording medium. For this reason, when the recording medium, which is capable of recording the image data and prohibiting recorded image data from being erased, is loaded, and when the recording medium is instructed to initialize, the image data can be prevented from being inadvertently erased.

The digital camera according to the second aspect of the invention further comprises an image data backup unit. When the loaded recording medium is instructed to initialize by the initialization instruction unit, the image data backup unit may store image data, which is recorded on the recording medium and is prohibited from being erased, in the storage unit prior to execution of the initialization of the recording medium by the initialization unit, and the image data backup unit may transfer the image data stored in the storage unit so as to record the image data on the recording medium after the recording medium is initialized by the initialization unit.

In the digital camera according to the second aspect of the invention, the initialization unit may have an image data capacity detection unit. When the recording medium is instructed to initialize by the initialization instruction unit, the image data capacity detection unit may detect an unused capacity of the storage unit and may add volumes of the image data, which is prohibited from being erased to each other, and, on the basis of the unused capacity and the value of the added volumes, may determine whether all the pieces of image data which are prohibited from being erased can be stored in the storage unit.

In the digital camera according to the second aspect of the invention, when the determination result is affirmative, the initialization unit may store all the pieces of image data which are prohibited from being erased in the storage unit.

In the digital camera according to the second aspect of the invention, when the determination result is negative, the initialization unit may store image data, selected on the basis of a predetermined priority order corresponding to the image data in the storage unit.

In this manner, when all the pieces of image data which are prohibited from being erased cannot be stored in the storage unit due to a lack of storage capacity of the storage unit, image data, selected on the basis of the predetermined priority order corresponding to the image data, is stored in the storage unit. For this reason, even though the storage capacity of the storage unit is short, image data which is highly ranked in the predetermined priority order in response to the image data can be stored in the storage unit, and the image data can be prevented from being inadvertently erased.

In the digital camera according to the second aspect of the invention, a notification unit for notifying that, when the determination result is negative, all the pieces of image data which are prohibited from being erased cannot be stored in the storage unit may be provided.

In the digital camera according to the second aspect of the invention, the image data recorded onto the recording medium may have date information indicating the date on which the image data was recorded onto the recording medium, and the priority order is determined based on the recorded date.

According to the third aspect of the invention, there is provided a method of preventing image data from being erased in a digital camera, which is configured such that a recording medium can be loaded, said medium capable of recording photographed image data and prohibiting recorded image data from being erased, comprising: a step of instructing the loaded recording medium to initialize; and a step of performing a predetermined notification operation on the basis of the initialization instruction when image data, which is prohibited from being erased, is recorded onto the recording medium.

In this manner, when the recording medium onto which the image data which is prohibited from being erased is recorded is loaded, and when the recording medium is instructed to initialize, the image data can be prevented from being inadvertently erased.

The method of preventing image data from being erased according to the third aspect of the invention, the image data may be prohibited from being erased in units of photographed images.

In the method of preventing image data from being erased according to the third aspect of the invention, the recording medium may have image erasure prohibition information corresponding to the image data, and the step of performing the predetermined notification operation includes the step of performing a detection operation, for detecting the presence or absence of a recording medium having the image erasure prevention information, on the basis of the initialization instruction of the recording medium.

According to the fourth aspect of the invention, there is provided a method of preventing image data from being erased in a digital camera, onto which a recording medium can be loaded, said medium capable of recording photographed image data and prohibiting recorded image data from being erased, and which has a storage unit which can store the image data, comprising: a step of instructing the loaded recording medium to initialize; a step of storing image data, which is prohibited from being erased, in the storage unit on the basis of the initialization instruction of the recording medium when the image data recorded on the recording medium is prohibited from being erased, a step of initializing the recording medium; and a step of recording the image data stored in the storage unit onto the recording medium.

In this manner, when the recording medium onto which the image data which is prohibited from being erased is recorded is loaded, and when the recording medium is instructed to initialize, the image data can be prevented from being inadvertently erased.

In the method of preventing image data from being erased according to the fourth aspect of the invention, the step of storing the image data, which is recorded on the recording medium and is prohibited from being erased, in the storage unit further includes the step of determining whether all pieces of image data, which are prohibited from being erased, can be stored in the storage unit when the recording medium is instructed to initialize; and the determination may be performed such that, after an unused capacity of the storage unit is detected and volumes of the pieces of image data, which are prohibited from being erased, are added to each other, the value of the added volumes and the total amount of unused capacity are compared with each other.

In the method of preventing image data from being erased according to the fourth aspect of the invention, when the determination result is affirmative, all the pieces of image data that are prohibited from being erased may be stored in the storage unit.

In the method of preventing image data from being erased according to the fourth aspect of the invention, when the determination result is negative, image data selected on the basis of a predetermined priority order corresponding to the image data may be stored in the storage unit.

According to the fifth aspect of the invention, there is provided a method of preventing image data from being erased in a digital camera, onto which a recording medium can be loaded, said medium capable of recording photographed image data and prohibiting the recorded image data from being erased, and which has a storage unit which can store the image data, comprising: a step of instructing the loaded recording medium to initialize; a step of determining whether all pieces of image data, which are prohibited from being erased, can be stored in the storage unit on the basis of the initialization instruction of the recording medium if image data is prohibited from being erased; and a step of performing a predetermined notification operation when the determination result is negative, wherein the determination is performed such that, after an unused capacity of the storage unit is detected and volumes of the pieces of image data, which are prohibited from being erased, are added to each other, the value of the added volumes and the total amount of unused capacity are compared with each other.

In this manner, even though the storage capacity of the storage unit is short, image data which is highly ranked in a predetermined priority order corresponding to the image data can be stored in the storage unit, and the image data can be prevented from being inadvertently erased.

What is claimed is:

1. A digital camera, onto which a recording medium can be loaded, said medium capable of recording photographed image data and prohibiting recorded image data from being erased, comprising:
   a format instruction unit for instructing the loaded recording medium to format; and
   a notification unit for performing a predetermined notification operation that notifies that the format will be executed, wherein
   the notification unit performs the predetermined notification operation when the recording medium is instructed to format by the format instruction unit, if image data, which is prohibited from being erased, is recorded on the recording medium.

2. A digital camera according to claim 1, wherein the recording medium has image erasure prohibition information for image data which is prohibited from being erased.

3. A digital camera according to claim 1, wherein the recorded image data may be prohibited from being erased in units of photographed images.

4. A digital camera according to claim 2, further comprising an erasure prohibition information detection unit, wherein the erasure prohibition information detection unit performs a detection operation for detecting the presence or absence of image erasure prohibition information in the loaded recording medium when the recording medium is instructed to format by the format instruction unit, and causes the notification unit to perform a predetermined notification operation when a recording medium having the image erasure prohibition information is detected.

5. A digital camera according to claim 1, further comprising a liquid crystal display, wherein the notification operation for notifying that the format will be executed, in response to the instruction information, is performed by displaying a message on the liquid crystal display indicating that the format will be executed.

6. A method of preventing image data from being erased in a digital camera, which is configured such that a recording medium can be loaded, said medium capable of recording photographed image data and prohibiting recorded image data from being erased, comprising:
   a step of instructing the loaded recording medium to format; and
   a step of performing a predetermined notification operation on the basis of the format instruction when image data, which is prohibited from being erased, is recorded onto the recording medium.

7. A method of preventing image data from being erased according to claim 6, wherein the recorded image data may be prohibited from being erased in units of photographed images.

8. A method of preventing image data from being erased according to claim 7,
   wherein the recording medium can have image erasure prohibition information corresponding to the recorded image data, and
   the step of performing the predetermined notification operation includes the step of performing a detection operation for detecting the presence or absence of a recording medium having the image erasure prohibition information, on the basis of the format instruction of the recording medium.

* * * * *